(12) United States Patent
Nakano

(10) Patent No.: US 8,480,563 B2
(45) Date of Patent: Jul. 9, 2013

(54) ENDOSCOPE APPARATUS AND METHOD

(75) Inventor: Sumito Nakano, Tokyo (JP)

(73) Assignee: Olympus Corporation, Tokyo (JP)

( * ) Notice: Subject to any disclaimer, the term of this patent is extended or adjusted under 35 U.S.C. 154(b) by 688 days.

(21) Appl. No.: 12/621,815

(22) Filed: Nov. 19, 2009

(65) Prior Publication Data

US 2010/0128115 A1 May 27, 2010

(30) Foreign Application Priority Data

Nov. 25, 2008 (JP) ................. P2008-299244

(51) Int. Cl.
*A61B 1/04* (2006.01)

(52) U.S. Cl.
USPC ............ 600/109; 600/160; 600/168; 348/65; 348/68; 348/75

(58) Field of Classification Search
USPC ........ 348/65, 68, 69, 70, 71, 74, 75; 600/101, 600/109, 137, 160, 168, 176, 111, 117, 118, 600/161, 921
See application file for complete search history.

(56) References Cited

U.S. PATENT DOCUMENTS

| | | | |
|---|---|---|---|
| 4,621,284 A * | 11/1986 | Nishioka et al. | 348/69 |
| 5,668,631 A * | 9/1997 | Norita et al. | 356/608 |
| 5,860,912 A * | 1/1999 | Chiba | 600/111 |
| 6,063,023 A * | 5/2000 | Sakiyama et al. | 600/118 |
| 6,120,435 A * | 9/2000 | Eino | 600/118 |
| 6,339,446 B1 * | 1/2002 | Miyoshi | 348/65 |
| 6,407,747 B1 * | 6/2002 | Chui et al. | 345/660 |
| 6,791,531 B1 * | 9/2004 | Johnston et al. | 345/157 |
| 7,520,854 B2 * | 4/2009 | Sato | 600/118 |
| 7,746,321 B2 * | 6/2010 | Banning | 345/157 |
| 7,850,598 B2 * | 12/2010 | Kobayashi et al. | 600/109 |
| 2002/0137986 A1 * | 9/2002 | Ogawa | 600/160 |
| 2002/0172404 A1 * | 11/2002 | Badilini | 382/128 |
| 2002/0191074 A1 * | 12/2002 | Ogawa | 348/65 |
| 2003/0060679 A1 * | 3/2003 | Murata et al. | 600/111 |
| 2004/0019255 A1 * | 1/2004 | Sakiyama | 600/175 |
| 2004/0054256 A1 * | 3/2004 | Ogawa | 600/118 |
| 2006/0178561 A1 * | 8/2006 | Nakano et al. | 600/117 |
| 2007/0165306 A1 * | 7/2007 | Bendall et al. | 359/464 |
| 2007/0177153 A1 * | 8/2007 | Takahashi | 356/479 |

FOREIGN PATENT DOCUMENTS

| | | |
|---|---|---|
| JP | 5-333840 A | 12/1993 |
| JP | 10-232117 A | 9/1998 |
| JP | 2004-049638 A | 2/2004 |

OTHER PUBLICATIONS

Japanese Office Action dated Jan. 29, 2013 (and English translation thereof) in counterpart Japanese Application No. 2008-299244.

* cited by examiner

*Primary Examiner* — LaShonda Jacobs

(74) *Attorney, Agent, or Firm* — Holtz, Holtz, Goodman & Chick, P.C.

(57) ABSTRACT

An endoscope apparatus includes: an endoscope that generates an image of an object; a display portion that displays the image and a cursor that designates a position on an image based on the image; a characteristic quantity calculating portion that calculates, based on the image, a characteristic quantity of the image on the basis of the position designated by the cursor; and a control portion that controls movement of the cursor in accordance with the characteristic quantity.

14 Claims, 12 Drawing Sheets

ENDOSCOPE APPARATUS AND METHOD

CROSS-REFERENCE TO RELATED APPLICATIONS

Priority is claimed on Japanese Patent Application No. 2008-299244, filed Nov. 25, 2008, the content of which is incorporated herein by reference.

BACKGROUND OF THE INVENTION

1. Field of the Invention

The present invention relates to an endoscope apparatus that processes a video signal obtained by imaging an object and a method.

2. Description of Related Art

Industrial endoscopes are used to observe or inspect inside damage, corrosion, and the like of a boiler, a turbine, an engine, a chemical plant, a water pipe, and the like. Also, there are industrial endoscopes that have a function of measuring length, area, and the like based on a measuring point designated on an image imaged by the endoscope. Conventionally, when performing measurement using an image, a user moves a cursor for designating the measuring point by, for example, tilting a lever of a joystick in a desired direction.

Also, as a method of moving a cursor, the following method has been used. For example, when the user tilts the lever of the joystick in any one of four directions or eight directions and then immediately returns the lever to its original position, the cursor moves only a predetermined distance (for example, the distance of one pixel of the image). Also, when the user continues tilting the lever of the joystick for a long time in the desired direction, the cursor accelerates. Also, in the case of using an analog joystick, the movement speed of the cursor changes in accordance with the amount of tilting of the lever by the user.

Japanese Unexamined Patent Application, First Publication No. H05-333840 discloses a method in an image display device of rapidly moving a cursor in a region other than operation menu, and finely moving the cursor in the operation menu.

SUMMARY OF THE INVENTION

An endoscope apparatus according to an aspect of the invention includes: an endoscope that generates an image of an object; a display portion that displays the image and a cursor that designates a position on the image; a characteristic quantity calculating portion that calculates, based on the image, a characteristic quantity of the image on the basis of the position designated by the cursor; and a control portion that controls movement of the cursor in accordance with the characteristic quantity.

Also, a method according to an aspect of the invention includes the following steps of: generating an image of an object; displaying the image and a cursor that designates a position on the image based on the image; calculating, based on the image, a characteristic quantity of the image on the basis of the position designated by the cursor; and controlling the movement of the cursor in accordance with the characteristic quantity.

DETAILED DESCRIPTION OF THE INVENTION

Figure 1:
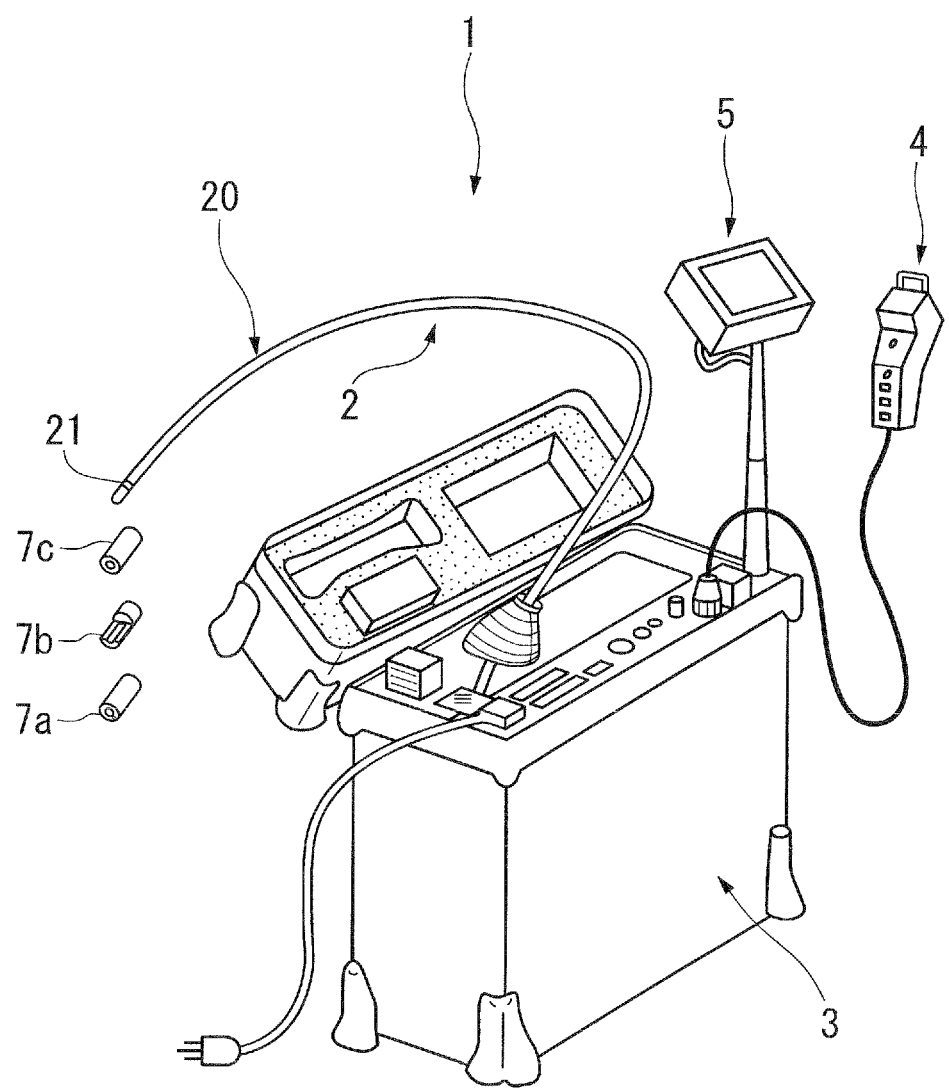
FIG. 1 is a perspective view that shows the entire configuration of an endoscope apparatus in accordance with an embodiment of the present invention.

Hereinbelow, an embodiment of the present invention will be described with reference to the appended drawings. FIG. 1 shows the entire configuration of an endoscope apparatus according to one embodiment of the present invention. As shown in FIG. 1, an endoscope apparatus 1 includes an endoscope 2 that has an elongate insertion portion 20, a control unit 3 that is a control device provided with a housing portion that houses the insertion portion 20 of the endoscope 2, a remote controller 4 that performs the required operations when executing various controls of the entire apparatus, and an LCD 5 (liquid crystal display monitor) that is a display device that displays an endoscopic image, operation control contents (for example, processing menu), and the like.

The insertion portion 20 is constituted by a rigid distal end portion 21 and a flexible tube portion (for example, a bending portion 22 that is capable of bending vertically and horizontally (FIG. 2)) being consecutively installed. Various optical adapters, such as a stereo optical adapter 7a, 7b having two observation fields of view or an ordinary observation optical adaptor 7c having one observation field of view, can be attached to the distal end portion 21 in a freely detachable manner.

Figure 2:
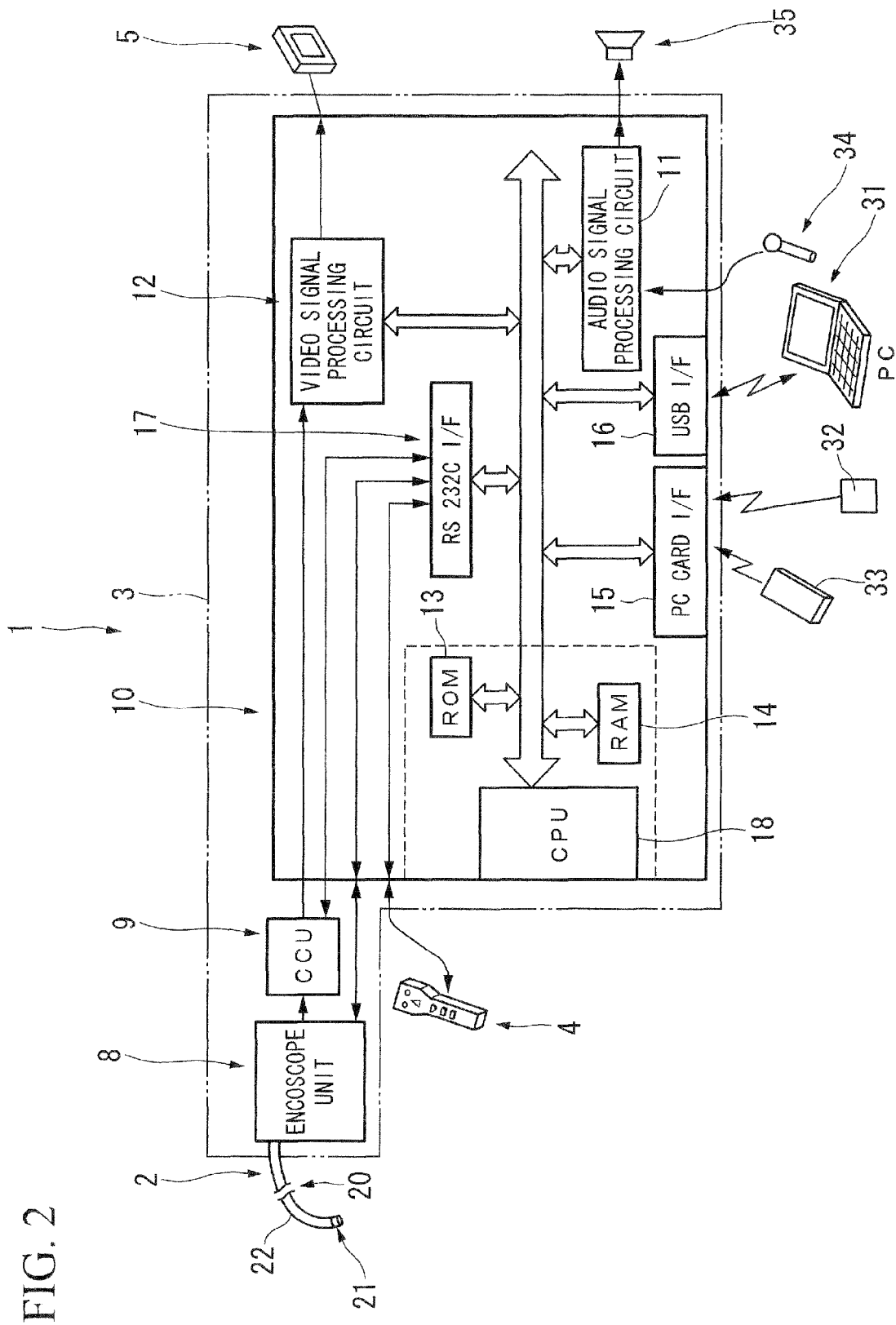
FIG. 2 is a block diagram that shows the internal configuration of the configuration of the endoscope apparatus in accordance with an embodiment of the present invention.

As shown in FIG. 2, an endoscope unit 8, a camera-control unit (hereinafter referred to as "CCU") 9, and a control unit 10 are provided in the control unit 3, with the base end portion of the insertion portion 20 being connected to the endoscope unit 8. The endoscope unit 8 is provided with a light source apparatus (not illustrated) that supplies illumination light necessary for observation, and a bending apparatus (not illustrated) that bends the bending portion 22 constituting the insertion portion 20.

Figure 5:
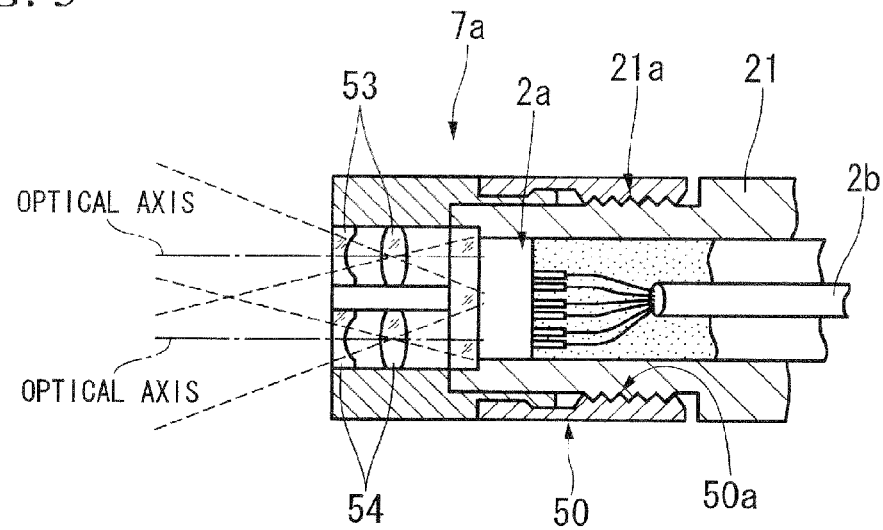
FIG. 5 is a cross-sectional view that shows the internal configuration of the stereo optical adapter that is used in the endoscope apparatus in accordance with an embodiment of the present invention.

A solid-state imaging device 2a is built into the distal end portion 21 of the insertion portion 20 (refer to FIG. 5). The solid-state imaging device 2a generates an image signal by performing photoelectric conversion of an object image formed through the optical adapter. The image signal is output from the solid-state imaging device 2a and is input to the CCU 9. This image signal is converted to a video signal (image data) such as an NTSC signal in the CCU 9, and is supplied to the control unit 10.

An audio signal processing circuit 11, a video signal processing circuit 12 to which the video signal is input, a ROM 13, a RAM 14, a PC card I/F 15 (PC card interface), a USB I/F 16 (USB interface), an RS-232C I/F 17 (RS-232C interface), and a CPU 18 that executes various functions based on a main program and performs operation control are provided in the control unit 10.

The CCU 9 and the endoscope unit 8 are connected to the RS-232C I/F 17. In addition, the remote controller 4 which performs control and operation instructions of the CCU 9, endoscope unit 8, and the like is connected to the RS-232C I/F 17. When a user operates the remote controller 6, a communication required in controlling the CCU 9 and the endoscope unit 8 is performed based on the operation.

The USB I/F 16 is an interface that provides an electrical connection between the control unit 3 and a personal computer 31. Connecting the control unit 3 and the personal computer 31 via this USB I/F 16 enables the performances, such as display instruction of endoscopic images and various instruction controls of image processing and the like during measurement, at the personal computer 31 side. In addition, this enables input and output of control information, data, and the like required for various processings between the control unit 3 and the personal computer 31.

Also, a so-called memory card, which is a storage medium such as a PCMCIA memory card 32 or a flash memory card 33, can be freely attached to the PC card I/F 15 or detached from the PC card I/F 15. Mounting the memory card in the PC card I/F 15 enables data such as control-processing information or image information stored in the memory card to be taken into the control unit 3 or data such as the control-processing information or the image information to be stored in the memory card by means of control of the CPU 18.

The video signal processing circuit 12 performs processing of synthesizing the video signal from the CCU 9 and a graphic image signal based on operation menu and various GUI components (cursor, etc.) generated by control of the CPU 18 in order to display a composite image that combines an endoscopic image supplied from the CCU 9 and a graphic image of the operation menus and the various GUI components, and processing required for performing display on the screen of the LCD 5, and supplies the video signal to the LCD 5. Also, the video signal processing circuit 12 can perform processing for independently displaying only the endoscopic image or the image of operation menu and the like. Accordingly, the endoscopic image, the graphic image of the operation menu and the like, or the composite image of the endoscopic image and the graphic image of the operation menu and the like, is displayed on the screen of the LCD 5.

An audio signal generated by gathering sound with a microphone 34 and stored in a storage medium such as a memory card, an audio signal obtained by replay of the storage medium such as the memory card, or an audio signal generated by the CPU 18 is supplied to the audio signal processing circuit 11. The audio signal processing circuit 11 performs processing on the audio signal such as an amplification processing required for replaying the supplied audio signal and outputs it to a speaker 35. Thereby, an audio is output from the speaker 35.

The CPU 18 executes a program that is stored in the ROM 13, whereby various circuit portions and the like are controlled so as to perform processings depending on the purpose, and operation control of the entire system is performed. Also, at the time of measurement, the CPU 18 takes in the video signal from the video signal processing circuit 12 and performs measurement processing based on the video signal. The RAM 14 is used as a work area for temporary storage of data by the CPU 18.

Figure 3:
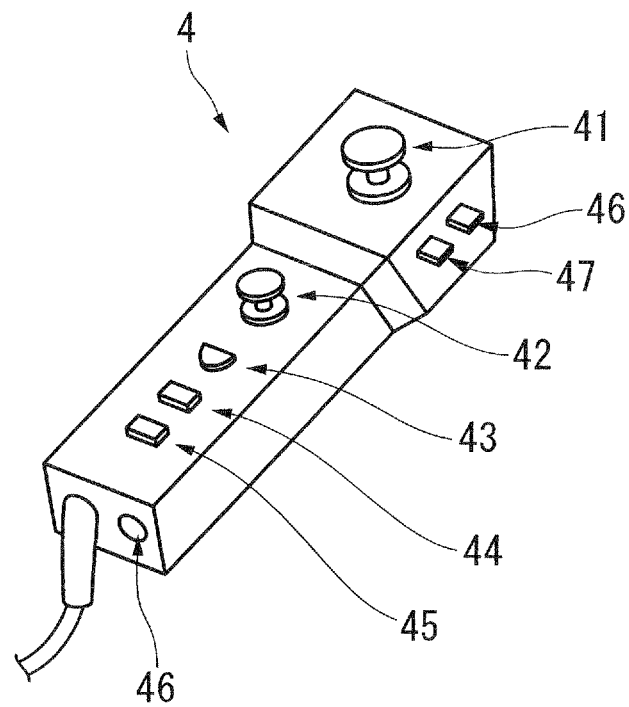
FIG. 3 is a perspective view of the remote controller provided in the endoscope apparatus in accordance with an embodiment of the present invention.

As shown in FIG. 3, a joystick 41, a lever switch 42, a freeze switch 43, a store switch 44, and a measurement execution switch 45 are provided on the front surface of the remote controller 4. Also, a WIDE switch 46 and a TELE switch 47 are provided on the side surface of the remote controller 4.

The joystick 41 is a switch that is operated for specifying the bending operation of the bending portion 22, and when tilted by a user, the bending portion 22 bends in a direction corresponding to the tilt direction by an amount corresponding to the tilt angle. Also, it is possible to input a fine adjustment instruction of the bending operation by pushing the joystick 41 directly downward. The lever switch 42 is a switch that is operated for cursor movement in the case of performing operations of various menus that are graphically displayed and measurements, and is constituted approximately the same as the joystick 41. The freeze switch 43 is a switch that relates to display on the LCD 5.

The store switch 44 is a switch that is used for storing a still image on the memory card when the still image is displayed by depressing the freeze switch 43. The measurement execution switch 45 is a switch that is used when running measurement software. The freeze switch 43, the store switch 44, and the measurement execution switch 45 are constituted by adopting depression-type switches that, for example, perform ON/OFF control by a depression operation.

The WIDE switch 46 and the TELE switch 47 are switches that are used when performing enlargement and reduction of the endoscopic image, respectively. The endoscopic image that is imaged by the insertion portion 20 is enlarged or reduced as needed by the video signal processing circuit 12. Control of the magnification of this enlargement or reduction is performed by operation of the WIDE switch 46 and the TELE switch 47.

Figure 4:
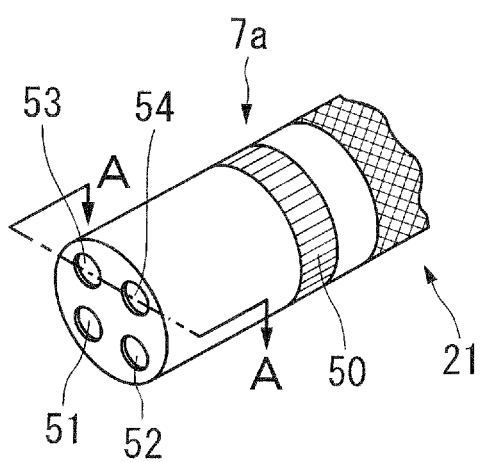
FIG. 4 is a perspective view of the stereo optical adapter that is used in the endoscope apparatus in accordance with an embodiment of the present invention.

FIG. 4 and FIG. 5 show example configurations of the stereo optical adaptor 7a that is one of the optical adaptors used in the endoscope apparatus 1 of the present embodiment. As shown in FIG. 4 and FIG. 5, a pair of illumination lenses 51 and 52 and two object lens systems 53 and 54 are provided at the distal end surface of the direct-view stereo optical adaptor 7a. As shown in FIG. 5, the optical adaptor 7a is integrally fixed by screwing a male screw 50a of a fixing ring 50 with a female screw 21a that is formed on the distal end portion 21.

As shown in FIG. 5, two optical images are formed via the two object lens systems 53 and 54 on an imaging surface of the solid-state imaging device 2a that is provided in the distal end portion 21. Then, an image signal that has been subjected to photoelectric conversion by this solid-state imaging device 2a is supplied to the CCU 9 via a signal wire 2b and the endoscope unit 8 that are electrically connected to the CCU 9 and is converted to a video signal, and thereafter is supplied to the video signal processing circuit 12. Hereinbelow, an image that is constituted by this video signal will be referred to as an original image.

Next, the way of calculating three-dimensional coordinates of a measuring point by stereo measurement will be described with reference to FIG. 6. For images that are imaged by the left side and right side optical systems, three-dimensional coordinates (X, Y, Z) of a measuring point 60 are calculated by a method of triangulation using the following Equation (1) to Equation (3). Note that it is assumed that the coordinates of measuring points 61 and 62 on the left and right images that have been subjected to distortion correction are $(X_L, Y_L)$ and $(X_R, Y_R)$, respectively, the distance between optical centers 63 and 64 of the left side and right side is D, the focal length is F, and $t=D/(X_L-X_R)$.

$$X = t \times X_R + D/2 \quad (1)$$

$$Y = t \times Y_R \quad (2)$$

$$Z = t \times F \quad (3)$$

When the coordinates of the measuring points 61 and 62 on the original images are determined in the aforementioned manner, the three-dimensional coordinates of the measuring point 60 are found using the parameters D and F. By calculating the three-dimensional coordinates of a number of points, various measurements such as a point-to-point distance, the distance between a line connecting two points and one point, surface area, depth, and surface shape, are possible. Also, it is possible to calculate the distance (object distance) from the left-side optical center 63 or the right-side optical center 64 to the object. In order to carry out the aforementioned stereo measurement, optical data that shows the characteristics of the optical system including the endoscope distal end portion 21 and the stereo optical adaptor are required. Note that the details of this optical data are disclosed for example in Japanese Unexamined Patent Application, First Publication No. 2004-49638, so an explanation thereof will be omitted here.

Figure 7:
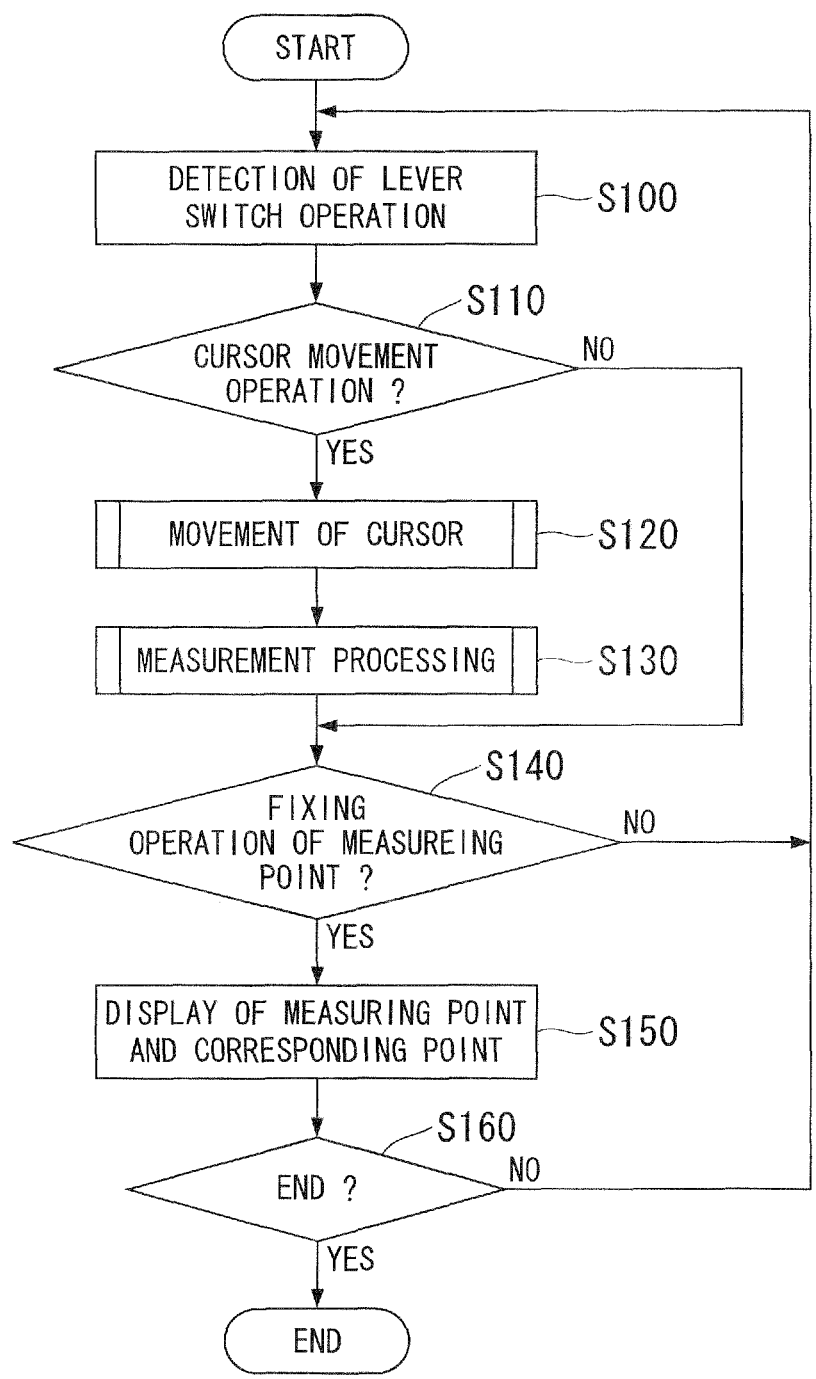
FIG. 7 is a flowchart that shows the procedure of processing during measurement in an embodiment of the present invention.
Figure 8:
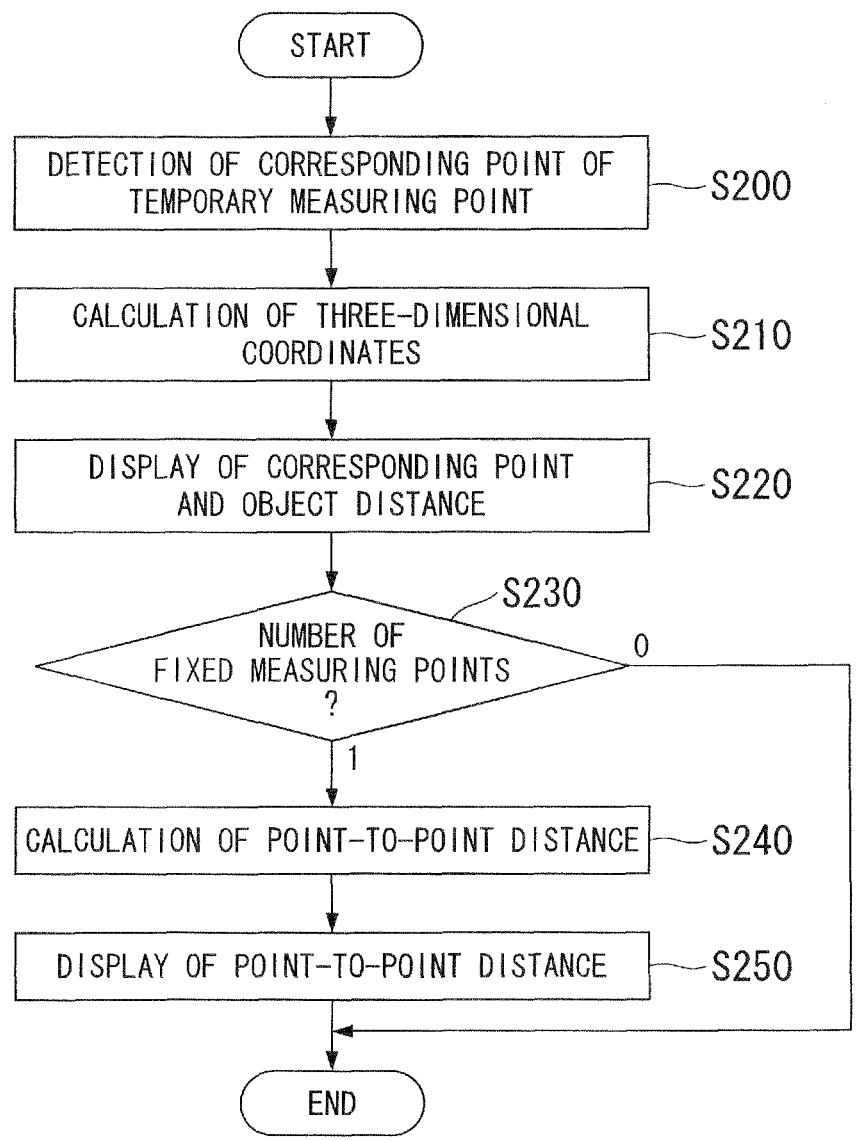
FIG. 8 is a flowchart that shows the procedure of processing during measurement in an embodiment of the present invention.

Next, as an example of the case of measuring point-to-point distance, the operation during stereo measurement will be described. FIG. 7 and FIG. 8 show processings executed by the CPU 18 during stereo measurement. Also, FIGS. 9A to 9C show screens (hereinbelow referred to as "measurement screen") displayed on the LCD 5 during stereo measurement.

Figure 9A:
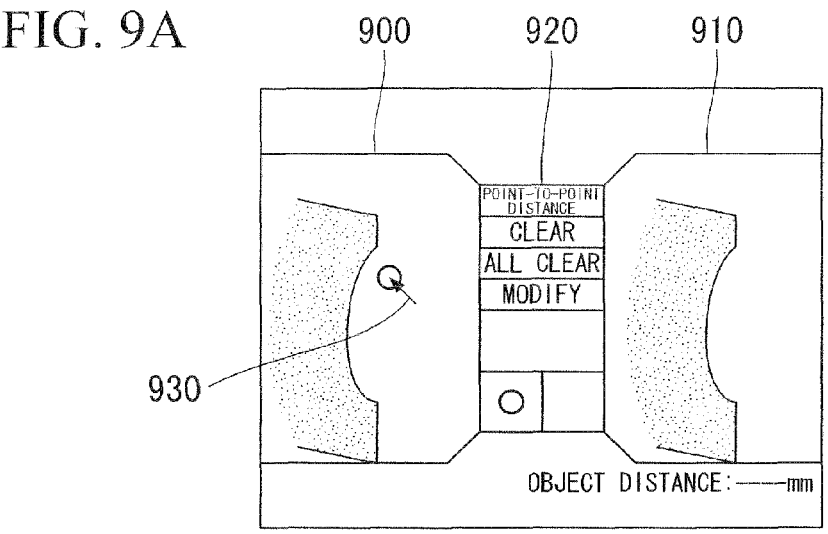
FIG. 9A is a reference drawing that shows a measurement screen in an embodiment of the present invention.
Figure 9B:
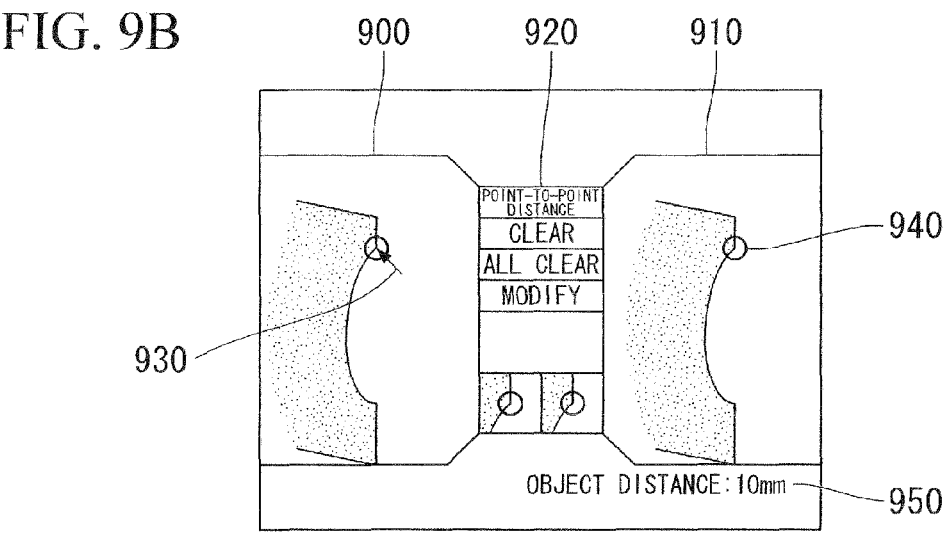
FIG. 9B is a reference drawing that shows a measurement screen in an embodiment of the present invention.
Figure 9C:
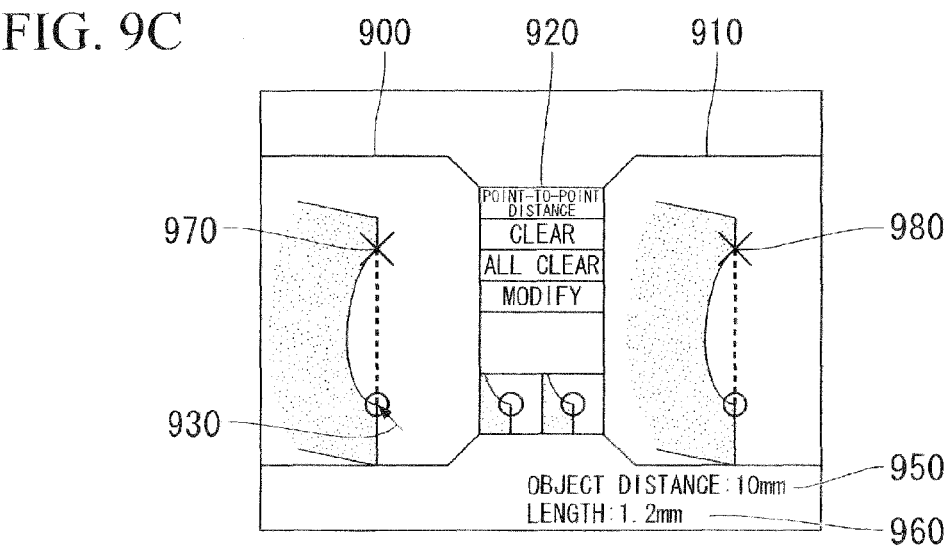
FIG. 9C is a reference drawing that shows a measurement screen in an embodiment of the present invention.

FIG. 9A shows a measurement screen when stereo measurement mode is started. A left image 900 and a right image 910, which respectively correspond to left and right object images of the same object imaged by the stereo optical adapter, and various menu 920 are displayed on the measurement screen. Also, a cursor 930 for designating a position on the left image 900 or the right image 910, or for choosing a desired operation from the menu 920 is displayed on the measurement screen.

When stereo measurement mode is started, the CPU 18 monitors a signal input from the remote controller 4, which is an input device, via the RS-232C I/F 17 and detects operation of the lever switch 42 (Step S100). Then, the CPU 18 determines whether or not a movement operation of the cursor has been performed (Step S110). In the case of the operation detected in Step S100 being an operation of tilting the lever switch 42, the CPU 18 determines that a movement operation of the cursor has been performed. In this case, the processing proceeds to Step S120. In the case of another operation being performed, the processing proceeds to Step S140.

In the case of the operation of tilting the lever switch 42 being performed, the CPU 18 performs movement of the cursor (Step S120). Details of the processing of Step S120 will be described below. Then, the CPU 18 performs measurement processing with regard to the point-to-point distance (Step S130).

FIG. 8 shows details of the processing of Step S130. In the case of the cursor being on the left image, the CPU 18 sets the position of the cursor at the current time as a temporary measuring point and detects the position (corresponding point) on the right image corresponding to the temporary measuring point (Step S200). The position of the corresponding point is detected by means of a known pattern-matching processing using images. Then, the CPU 18 computes three-dimensional coordinates based on the two-dimensional coordinates of the temporary measuring point and the corresponding point thereof (Step S210).

Figure 6:
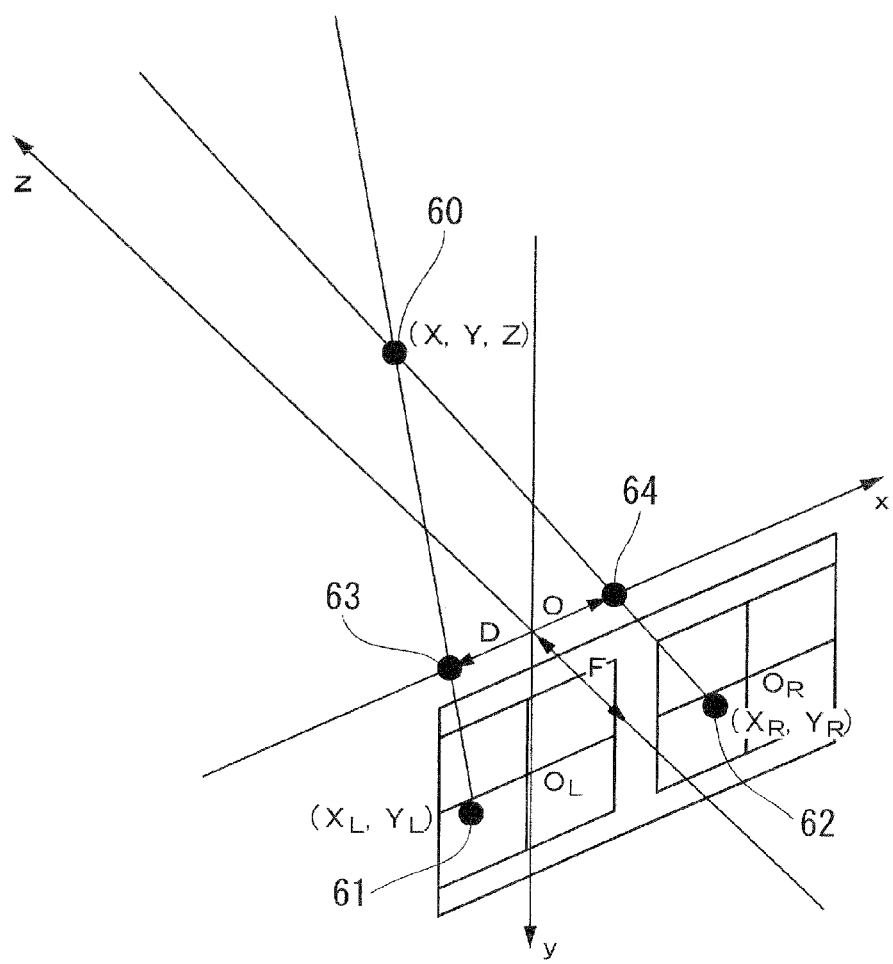
FIG. 6 is a reference drawing for describing the method of finding three-dimensional coordinates of a measuring point using stereo measurement in the embodiment of the present invention.

The calculation method of the three-dimensional coordinates is as described using FIG. 6. Also, the Z coordinate of the computed three-dimensional coordinates serves as the object distance. The computed three-dimensional coordinates are stored in the RAM 14 and are suitably read out by the CPU 18 in subsequent processings.

Then, the CPU 18 performs processing of displaying the corresponding point and the object distance (Step S220). At this time, the CPU 18 generates a graphic image signal that includes an icon of the corresponding point, text of the object distance, and the like, and outputs it to the video signal processing circuit 12. The video signal processing circuit 12 combines the video signal from the CCU 9 and the graphic image signal from the CPU 18, and outputs the combined video signal to the LCD 5. FIG. 9B shows a measurement screen at this time. A corresponding point 940 is expressed as the O mark at a position on the right image 910 corresponding to the position of the cursor 930.

Also, an object distance 950 is shown under the right image 910. Until the measuring point is fixed, the cursor 930 and the object distance 950 are updated in real time corresponding to operation of the lever switch 42.

Then, the CPU 18 checks the number of the measuring points that have been fixed at the current time (Step S230). As described below, fixing a measuring point is performed by pressing down the lever switch 42. In the case of the number of fixed measuring points being 0, the measurement processing ends. In the case of the number of fixed measuring points being 1, the CPU 18 computes the point-to-point distance based on the three-dimensional coordinates computed from the two-dimensional coordinates of the fixed measuring point and the corresponding point thereof, and the three-dimensional coordinates computed from the two-dimensional coordinates of the temporary measuring point and the corresponding point thereof (Step S240).

Then, the CPU 18 performs processing of displaying the point-to-point distance (Step S250).

At this time, the CPU 18 generates a graphic image signal that includes text of point-to-point distance and the like, and outputs it to the video signal processing circuit 12. The video signal processing circuit 12 combines the video signal from the CCU 9 and the graphic image signal from the CPU 18, and outputs the combined video signal to the LCD 5. FIG. 9C shows a measurement screen at this time. A point-to-point distance 960 is displayed under the object distance 950. After the measuring point is fixed, the object distance 950 and the point-to-point distance 960 are updated in real time corresponding to operation of the lever switch 42. After the processing of Step S250, the measurement processing ends.

Following measurement processing, the CPU 18 determines whether or not a fixing operation of the measuring point has been performed (Step S140). In the case of the operation detected in Step S100 being a depression operation with the lever switch 42, the CPU 18 determines that the fixing operation of the measuring point has been performed. In this case, the processing proceeds to Step S150. In the case of another operation being performed, the processing returns to Step S100.

In the case of the fixing operation of the measuring point being performed, the CPU 18 sets the position of the cursor at the current time as the measuring point and performs processing of displaying the measuring point and the corresponding point thereof (Step S150). At this time, the CPU 18 generates a graphic image signal that includes icons of the measuring point and the corresponding point, text of the object distance, and the like, and outputs it to the video signal processing circuit 12. The video signal processing circuit 12 combines the video signal from the CCU 9 and the graphic image signal from the CPU 18, and outputs the combined video signal to the LCD 5. As shown in FIG. 9C, a fixed measuring point 970 and its corresponding point 980 are expressed as the x mark.

Then, the CPU 18 determines whether or not to end the processing (Step S160). In the case of a predetermined operation, such as an operation of again fixing the measuring point, being detected, the processing ends. For any other case, the processing returns to Step S100.

Next, the processing of Step S120 will be described. Hereinbelow, three types of operations will be described.

First Operational Example

Figure 10:
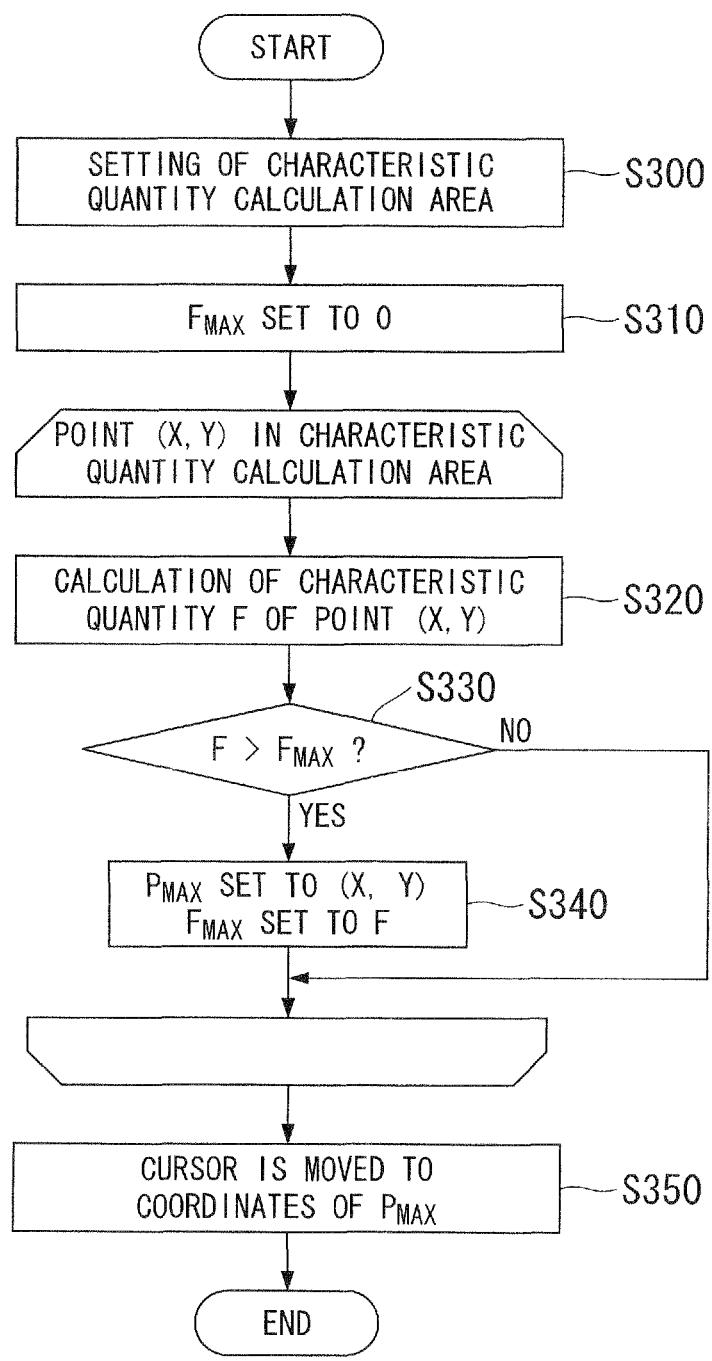
FIG. 10 is a flowchart that shows the procedure of processing according to a first operational example in an embodiment of the present invention.

First, a first operational example will be described. In the first operational example, in a characteristic quantity calculation area (predetermined area) that is based on the position of the cursor, the cursor moves to a position where the characteristic quantity of the image is a maximum. The characteristic quantity in the present embodiment quantitatively expresses the extent to which the image of the object in the predetermined area is suited to measurement by using the characteristic of the image. FIG. 10 shows the details of the processing of Step S120 in the first operational example.

Figure 11A:
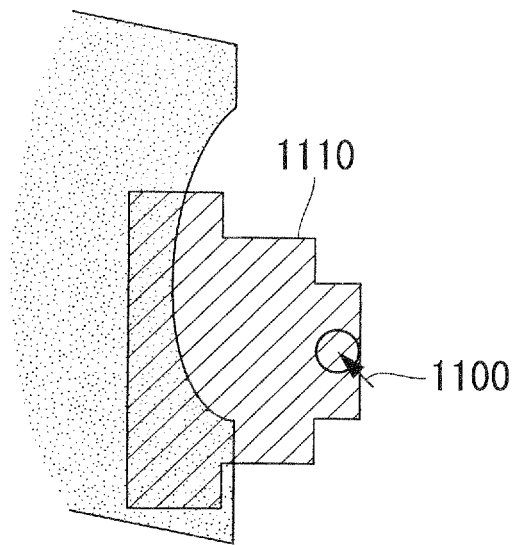
FIG. 11A is a reference drawing for explaining the cursor movement method according to the first operational example in an embodiment of the present invention.

The CPU 18 sets the characteristic quantity calculation area that is based on the cursor position on the left image at the current time (Step S300). FIG. 11A shows an example of the characteristic quantity calculation area. In FIG. 11A, a characteristic quantity calculation area 1110 is set on the left side of the cursor 1100. This characteristic quantity calculation area 1110 is a characteristic quantity calculation area in the case of an instruction to move the cursor 1100 to the left being input by tilting the lever switch 42 to the left. The shape and size of the characteristic quantity calculation area is not limited to the one shown in FIG. 11A, and may be various shapes and sizes.

The cursor 1100 moves to any position within the characteristic quantity calculation area 1110. In this case, since the user attempts to move the cursor 1100 to the left, the characteristic quantity calculation area 1110 spreads toward the left side of the cursor 1100 as shown in FIG. 11 so that the cursor does not move greatly different from the intent of the user.

Then, the CPU 18 initializes a variable Fmax to zero (Step S310). The variable Fmax is a variable showing the maximum value of the characteristic quantity of the image. Then, the CPU 18 computes a characteristic quantity F at a point P (coordinates (x, y)) in the characteristic quantity calculation area 1110 (Step S320).

The characteristic quantity F at the point P in the characteristic quantity calculation area 1110 is calculated with the following procedure. First, the CPU 18 computes an average $\mu_R$, a standard deviation $\sigma_R$, and a texture value $T_R$ of the pixel values of the point P and a partial image R in a small area that includes the periphery of the point P, in accordance with the following Equation (4) to Equation (6). In Equation (4) to Equation (6), it is assumed that N is the number of pixels contained in the partial image R, and f(i, j) is the pixel value of the coordinates (i, j) on the image.

$$\mu_R = \sum_{(i,j)\in R} f(i, j)/N \quad (4)$$

$$\sigma_R = \sqrt{\sum_{(i,j)\in R} \{f(i, j) - \mu_R\}^2 / N} \quad (5)$$

$$T_R = \sqrt{\sum_{(i,j)\in R} \{f(i, j) - f(i+1, j)\}^2 / N} + \sqrt{\sum_{(i,j)\in R} \{f(i, j) - f(i+1, j+1)\}^2 / N} + \sqrt{\sum_{(i,j)\in R} \{f(i, j) - f(i, j+1)\}^2 / N} + \sqrt{\sum_{(i,j)\in R} \{f(i, j) - f(i-1, j+1)\}^2 / N} \quad (6)$$

Then, the CPU 18 searches the right image for a partial image R' that matches the partial image R, and calculates a matching degree M between the partial images R and R'. Here, a normalized cross correlation coefficient of the pixel values is used as the matching degree M between the partial images R and R'. Also, the CPU 18 computes three-dimensional coordinates from the two-dimensional coordinates of the point P and the corresponding point thereof, and finds the object distance Z at the point P. The CPU 18 computes the characteristic quantity F in accordance with the following Equation (7).

$$F = w_\sigma \sigma_R + w_T T_R + w_M M + w_Z g(Z) \quad (7)$$

In Equation (7), $w_\sigma$, $w_T$, $w_M$, and $w_Z$ are predetermined coefficients, and g(Z) is a function that takes a large value for the object distance suited to measurement. Equation (8) is an example of the function g(Z) in which the image is suited to measurement when the object distance is 5 to 15 mm, and is no longer suited to measurement as the object distance becomes greater than 15 mm.

$$g(Z) = \begin{cases} 1 & (5 \leq Z < 15) \\ 1 - (Z - 15)/15 & (15 \leq Z < 30) \\ 0 & (Z < 5, 30 \leq Z) \end{cases} \quad (8)$$

In general, an image in which the edge of the object appears is suited to measurement. In this kind of image, since the contrast increases, the standard deviation $\sigma_R$, the texture value $T_R$, and the matching degree M between the partial images R and R' increase in Equation (7), and their contribution to the characteristic quantity F increases. Also, in the image in which the object distance is in a predetermined range as mentioned above, the value of g(Z) increases, and its contribution to the characteristic quantity F increases. Note that when finding the characteristic quantity F, at least one of the matching degree M between the partial images R and R' and the object distance Z may be used, and in the case of the computation capability of the CPU 18 being insufficient, the computation of the texture value $T_R$, the matching degree M between the partial images R and R', and the object distance Z may be omitted, so that $w_T=0$, $w_M=0$, and $w_z=0$. The characteristic quantity F is calculated in the aforementioned manner.

Following Step S320, the CPU 18 compares the characteristic quantity F calculated in Step S320 with the value of the variable Fmax, and determines whether or not F>Fmax (Step S330).

In the case of F>Fmax, the CPU 18 sets the coordinates (x, y) of the pixel P as the value of a variable Pmax, and sets the value of the characteristic quantity F as the value of the variable Fmax (Step S340). Also, in the case of F≦Fmax, the CPU 18 skips the processing of Step S340 and proceeds to the next processing.

The processings of Steps S320 to S340 are performed for each point in the characteristic quantity calculation area.

The points that are subject to the above processings need not be all of the points in the characteristic quantity calculation area. Instead, the characteristic quantity calculation area may be divided into a plurality of partial areas, and only representative points of each partial area may be subject to the above processings.

As a result of the above-mentioned processing, the value of the variable Fmax becomes a maximum value of the characteristic quantity F in the characteristic quantity calculation area, and the value of the variable Pmax becomes coordinates of a point at which the characteristic quantity F becomes the maximum value. Then, the CPU 18 performs processing of moving the cursor to the position of the coordinates indicated by the value of the variable Pmax (Step S350). At this time, the CPU 18 generates a graphic image signal that includes the cursor and the like, and outputs it to the video signal processing circuit 12. The video signal processing circuit 12 combines the video signal from the CCU 9 and the graphic image signal from the CPU 18, and outputs the combined video signal to the LCD 5.

Figure 11B:
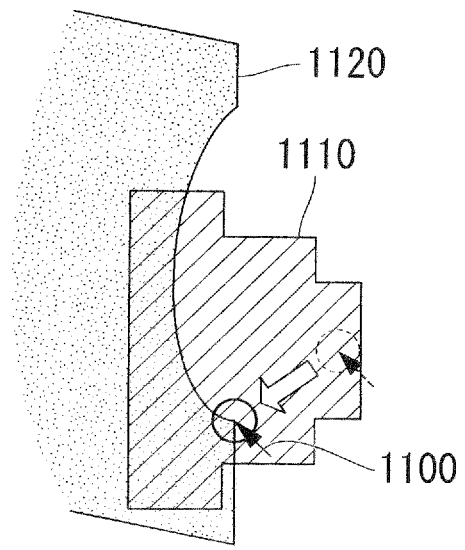
FIG. 11B is a reference drawing for explaining the cursor movement method according to the first operational example in an embodiment of the present invention.

FIG. 11B shows an example of movement of the cursor. The cursor 1100 moves to the position of the edge of the object 1120 in the characteristic quantity calculation area 1110.

In the above-mentioned processings, when the value of the variable Fmax is compared with a predetermined threshold value, and the value of the variable Fmax exceeds the predetermined threshold value, the cursor may be made to move to the position of the coordinates indicated by the value of the variable Pmax in the aforementioned manner, and when the value of the variable Fmax does not exceed the predetermined threshold value, the cursor may be made to move only a predetermined distance (for example, 1 pixel) in the direction in which the lever switch 42 is tilted.

Moreover, a coefficient α according to the distance from the cursor position to each point may be multiplied by the characteristic quantity F at each point in the characteristic quantity calculation area, and the cursor may be made to move to the point at which the value of α×F is a maximum.

Thereby, it becomes easy to cause the cursor to preferentially move to a position far from or a position near to the cursor position at the current time depending on the situation.

According to the first operational example, since the cursor moves to a position, at which the characteristic quantity of the image is large, in the direction in which the lever switch 42 is tilted, the cursor can be easily moved in a short time to a position that is suitable for measurement.

Second Operational Example

Figure 12:
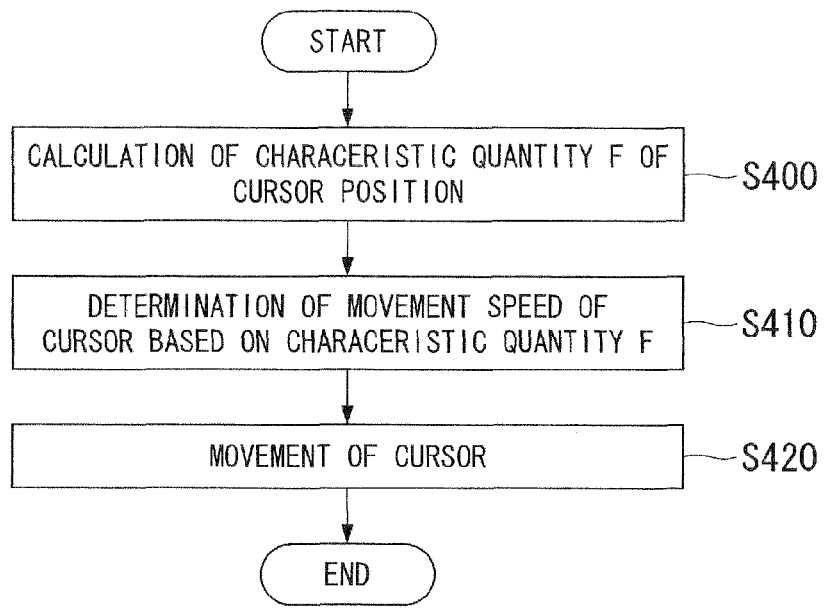
FIG. 12 is a flowchart that shows the procedure of processing according to a second operational example in an embodiment of the present invention.

Next, a second operational example will be described. In the second operational example, the movement speed of the cursor changes in accordance with the characteristic quantity of the image. FIG. 12 shows the details of the processing of Step S120 in the second operational example.

The CPU 18 computes the characteristic quantity F at the cursor position at the current time (Step S400). The calculation method of the characteristic quantity F is the same as in the first operational example. Then, the CPU 18 determines the movement speed of the cursor based on the characteristic quantity F (Step S410). Since the user generally needs to designate a position where the characteristic quantity is large on the image, the cursor is made to move quickly at a position where the characteristic quantity is small, and the cursor is made to move slowly at a position where the characteristic quantity is large, whereby it becomes easy for the user to move the cursor to a desired position.

Figure 13:
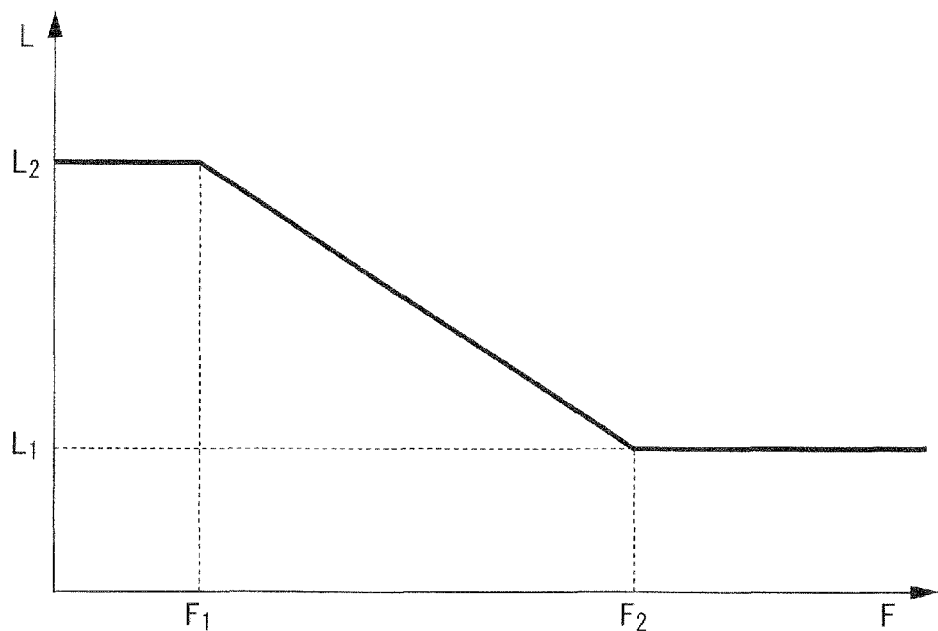
FIG. 13 is a reference drawing for explaining the cursor movement method according to the second operational example in an embodiment of the present invention.

More specifically, control of the movement speed of the cursor is for example performed by control of the movement distance of the cursor. FIG. 13 shows an example of the relation between the characteristic quantity F and the movement distance L of the cursor. In the case of the characteristic quantity F being less than or equal to a predetermined value $F_1$, the movement distance L of the cursor is set to a constant value $L_2$. In the case of the characteristic quantity F being greater than the predetermined value $F_1$ and less than or equal to a predetermined value $F_2$, the movement distance L of the cursor decreases according to the increase in the characteristic quantity F. When the characteristic quantity F is larger than the predetermined value $F_2$, the movement distance L of the cursor is set to a constant value $L_1$.

The CPU 18 performs movement of the cursor in the direction in which the lever switch 42 is tilted so that the cursor moves at the movement speed determined in Step S410 (Step S420). For example, when controlling the movement speed of the cursor by controlling the movement distance of the cursor, the CPU 18 performs processing of displaying the cursor at a position separated from the cursor position at the current time by a distance corresponding to the characteristic quantity F in the direction in which the lever switch 42 is tilted.

Control of the movement speed of the cursor may be performed by control of a movement time interval of the cursor. More specifically, first the CPU 18 sets the movement time interval according to the characteristic quantity F. In the case of the characteristic quantity F being small, the movement time interval is small in order to move the cursor at a high speed, and in the case of the characteristic quantity F being large, the movement time interval is large in order to move the cursor at a low speed.

The CPU 18 activates a timer and goes into standby until the set movement time interval has elapsed. When the set movement time interval has elapsed, it performs processing of displaying the cursor at a position separated from the cursor position at the current time by a predetermined distance in the direction in which the lever switch 42 is tilted.

According to the second operational example, since the cursor moves at a high speed at a position where the characteristic quantity of the image is small and not suitable for measurement, and the cursor moves slowly at a position where the characteristic quantity of the image is large and suitable for measurement, the cursor can be easily moved in a short time to a position that is suitable for measurement.

Third Operational Example

Figure 14:
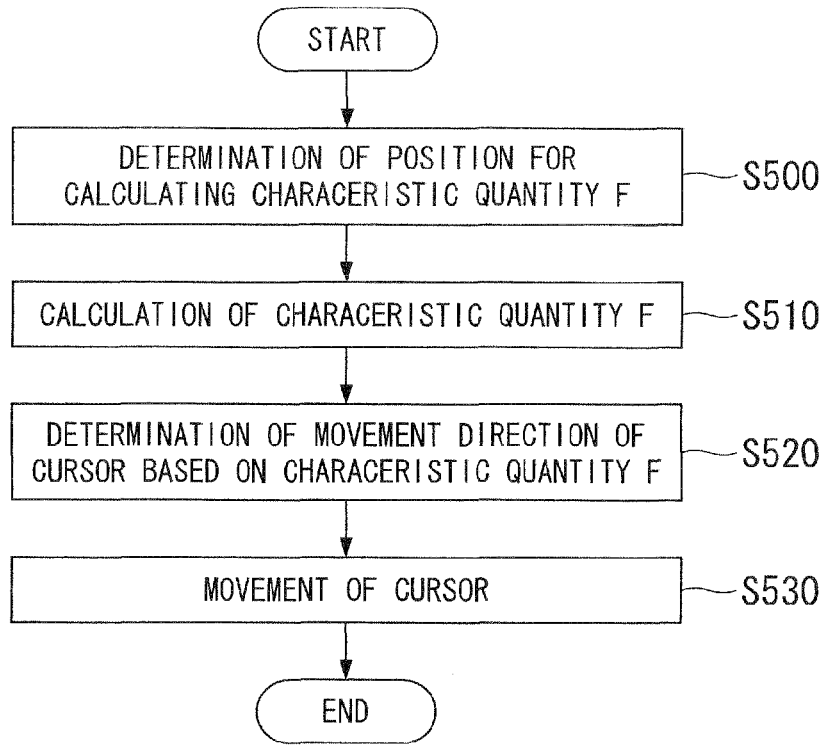
FIG. 14 is a flowchart that shows the procedure of processing according to a third operational example in an embodiment of the present invention.

Next, a third operational example will be described. In the third operational example, the movement direction of the cursor changes in accordance with the characteristic quantity of the image. FIG. 14 shows the details of the processing of Step S120 in the third operational example.

Figure 15:
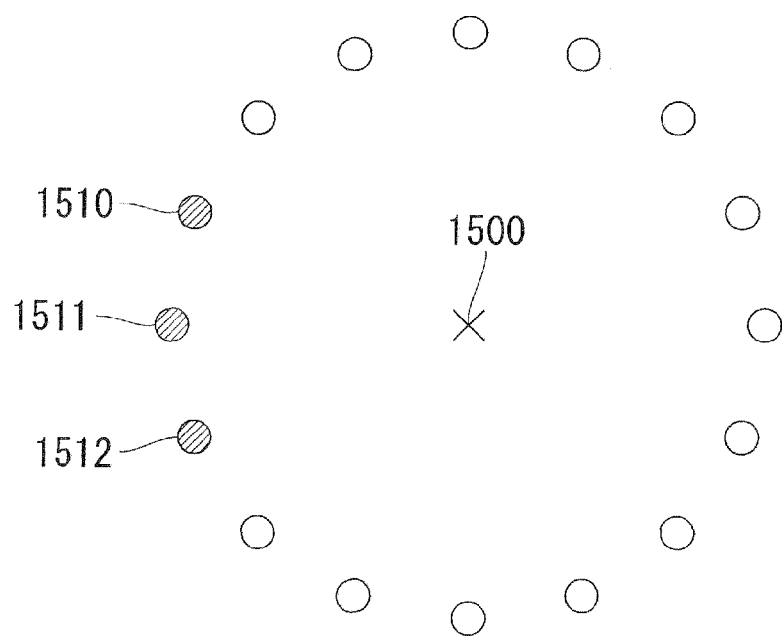
FIG. 15 is a reference drawing for explaining the cursor movement method according to the third operational example in an embodiment of the present invention.

The CPU 18 determines positions for computing the characteristic quantity F out of a plurality of positions centered on the cursor position at the current time (Step S500). FIG. 15 shows an example of the positions for computing the characteristic quantity F. The characteristic quantity F is computed at some of 16 points arranged in a circle centered on the cursor position 1500 at the current time. For example, in the case of the lever switch 42 being tilted to the left side, the characteristic quantity F is computed at three points 1510, 1511, and 1512 that are located on the left side of the cursor position 1500 at the current time.

After determining the positions for computing the characteristic quantity F, the CPU 18 computes the characteristic quantity F at the determined positions (Step S510). The calculation method of the characteristic quantity F is the same as in the first operational example. Then, the CPU 18 determines the movement direction of the cursor based on the characteristic quantity F of the plurality of points (Step S520). At this time, the direction in which the characteristic quantity F is larger becomes the movement direction of the cursor.

Then, the CPU 18 performs movement of the cursor so that the cursor moves by a predetermined distance in the direction determined in Step S510 (Step S530). More specifically, when the characteristic quantity F is computed at the points 1510, 1511, and 1512 in FIG. 15, for example, the cursor moves to the point at which the characteristic quantity F is largest among these three points. The movement direction of the cursor is preferably a direction in a definite range that is based on the direction in which the lever switch 42 is tilted so that the cursor does not move greatly different from the intent of the user.

According to the third operational example, since the cursor moves toward the direction in which the characteristic quantity of the image is large, the cursor can be easily moved in a short time to a position suitable for measurement.

Fourth Operational Example

Figure 16:
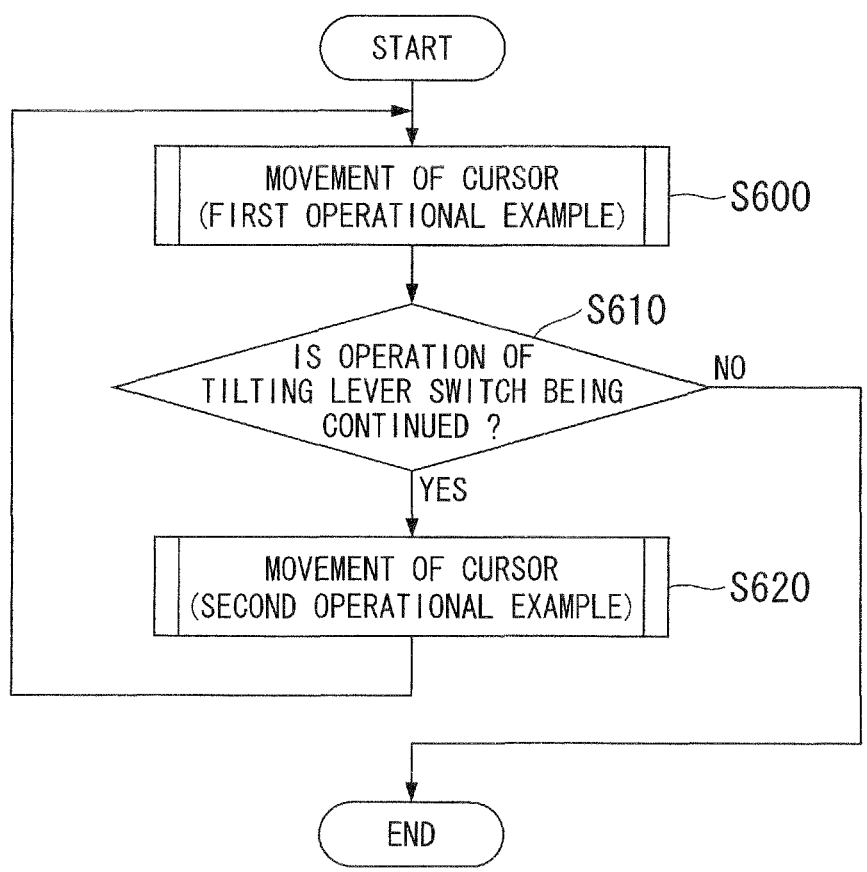
FIG. 16 is a flowchart that shows the procedure of processing according to a fourth operational example in an embodiment of the present invention.

Next, a fourth operational example will be described. In the fourth operational example, control is performed that combines the cursor movement controls of the aforementioned first through third operational examples. Although various combinations can be considered as a combination of operational examples, as an example below, a control method that combines the cursor movement control by the first operational example and the cursor movement control by the second operational example will be described. FIG. 16 shows the details of the processing of Step S120 in the fourth operational example.

First, the CPU 18 performs movement of the cursor according to the processings (FIG. 10) described in the first operational example (Step S600). Then, the CPU 18 monitors a signal input from the remote controller 4 via the RS-232C I/F 17, and determines whether or not an operation of tilting the lever switch 42 is being continued (Step S610).

When the operation of tilting the lever switch 42 is being continued (when the state of tilting the lever switch 42 is held), the CPU 18 performs movement of the cursor according to the processings (FIG. 12) described in the second operational example (Step S620). Then, the processing returns to Step S600. Moreover, when the operation of tilting the lever switch 42 is not continued (that is, when the lever switch 42 has returned to its original state), the processing ends.

According to the aforementioned processings, first, the cursor moves to a position at which the characteristic quantity of the image in the characteristic quantity calculation area is a maximum, according to the processings (FIG. 10) described in the first operational example. If a position that a user wants to designate is near the cursor position, it is possible to move the cursor in a short time to a position suitable for measurement. If a position that the user wants to designate is not near the cursor position, the user needs to move the cursor a long distance. Accordingly, in the case of the operation of tilting the lever switch 42 being continued, a point that the user wants to designate is considered to be at a place that is far from the cursor position.

Therefore, while the operation of tilting the lever switch 42 is being continued, the cursor moves at a speed corresponding to the characteristic quantity of the image at the cursor position, according to the processings (FIG. 12) described in the second operational example. Since the movement of the cursor is fast at a position where the characteristic quantity of the image is small, the cursor can be moved in a short time to a desired position. Also, since the movement of the cursor becomes slow when the cursor moves to a position where the characteristic quantity of the image is large, it is possible to prevent the cursor from overshooting the desired position because of losing the timing of stopping movement of the cursor.

In the aforementioned, after performing the movement control of the cursor by the first operational example, the movement control of the cursor by the second operational example is performed, but the order may be reversed. Also, the combination of movement control of the cursor is not limited to the above, and various combinations are possible including the movement control of the cursor by the third operational example.

According to the fourth operational example, by combining a plurality of cursor movement controls, it is possible to move the cursor so that the intent of the user may be reflected as much as possible in the movement of the cursor in correspondence with the operation of the lever switch 42.

As described above, according to this embodiment, by controlling movement of the cursor in accordance with the characteristic quantity of the image, which changes depending on the position or state of the object, it is possible to perform movement of the cursor that reflects the position and state of the object and to reduce the load on the user associated with the operation.

While preferred embodiments of the invention have been described and illustrated above, it should be understood that these are exemplary of the invention and are not to be considered as limiting. Modifications can be made without departing from the spirit or scope of the present invention.

What is claimed is:
1. An endoscope apparatus comprising:
an endoscope that generates an image of an object;

a display portion that displays the image and a cursor that designates a position in the image;

a characteristic quantity calculating portion that calculates, based on the image, a characteristic quantity of the image on the basis of the position designated by the cursor, the characteristic quantity representing an extent to which a position in the image is suited to a measurement processing that uses a characteristic of the image; and a control portion that controls movement of the cursor in accordance with the characteristic quantity.

2. The endoscope apparatus according to claim 1, further comprising a measurement processing portion that performs the measurement processing of the object based on the position in the image that is designated by the cursor, wherein the characteristic quantity calculating portion calculates the characteristic quantity based on a measurement result of the object that was measured by the measurement processing portion.

3. The endoscope apparatus according to claim 2, wherein the measurement processing portion calculates as the measurement result at least one of a matching degree of partial images in a plurality of object images related to the same object and an object distance of the object.

4. The endoscope apparatus according to claim 2, wherein:

the measurement processing portion measures the object at a plurality of positions included in an area of the image that is determined based on the position in the image that is designated by the cursor;

the characteristic quantity calculating portion calculates a plurality of characteristic quantities of the object in the area based on the measurement results; and the control portion moves the cursor to a position suited to the measurement processing in the area based on the characteristic quantities.

5. The endoscope apparatus according to claim 2, wherein:

the measurement processing portion measures the object at a plurality of positions in the image that are determined based on the position in the image that is designated by the cursor;

the characteristic quantity calculating portion calculates a plurality of characteristic quantities of the object at the determined positions based on the measurement results; and the control portion controls a movement direction of the cursor so that the cursor moves toward a position suited to the measurement processing based on the characteristic quantities.

6. The endoscope apparatus according to claim 4, further comprising a detecting portion that detects a movement instruction of the cursor from an input device, wherein the measurement processing portion determines the area based on a movement direction of the cursor detected by the detecting portion.

7. The endoscope apparatus according to claim 5, further comprising a detecting portion that detects a movement instruction of the cursor from an input device, wherein the measurement processing portion determines the plurality of positions based on the movement direction of the cursor detected by the detecting portion.

8. The endoscope apparatus according to claim 2, wherein the control portion makes a movement speed of the cursor slow when the characteristic quantity is suited to the measurement processing.

9. The endoscope apparatus according to claim 1, wherein the characteristic quantity calculating portion calculates the characteristic quantity based on at least one of brightness and texture value of the image on the basis of the position designated by the cursor.

10. A method comprising:

generating, with an imaging device, an image of an object;

displaying, on a display, the image and a cursor that designates a position in the image;

calculating, based on the image, a characteristic quantity of the image on the basis of the position designated by the cursor, the characteristic quantity representing an extent to which a position in the image is suited to a measurement processing that uses a characteristic of the image; and controlling movement of the cursor in accordance with the characteristic quantity.

11. An endoscope apparatus comprising:

an endoscope that generates an image of an object;

a display portion that displays the image and a cursor that designates a position in the image;

a characteristic quantity calculating portion that calculates, based on the image, a characteristic quantity of the image on the basis of the position designated by the cursor, the characteristic quantity representing an extent to which a position in the image is suited to a measurement processing that uses a characteristic of the image; and means for controlling movement of the cursor in accordance with the characteristic quantity.

12. The endoscope apparatus according to claim 2, wherein:

the measurement processing portion measures the object at a plurality of positions included in an area of the image that is determined based on the position in the image that is designated by the cursor;

the characteristic quantity calculating portion calculates a plurality of characteristic quantities of the object in the area based on the measurement results; and the control portion moves the cursor based on a user's input and guides the cursor based on the characteristic quantities to a position in the predetermined area.

13. The endoscope apparatus according to claim 2, wherein:

the measurement processing portion measures the object at a plurality of positions in the image that are determined based on the position in the image the image that is designated by the cursor;

the characteristic quantity calculating portion calculates a plurality of characteristic quantities of the object at the determined positions based on the measurement results; and the control portion moves the cursor based on a user's input and guides a movement direction of the cursor based on the characteristic quantities.

14. The endoscope apparatus according to claim 2, wherein the control portion moves the cursor based on a user's input and controls a movement speed of the cursor based on the characteristic quantity.

* * * * *